United States Patent
St. John Killick

(10) Patent No.: US 7,194,422 B1
(45) Date of Patent: Mar. 20, 2007

(54) DISAGGREGATED DATABASES FOR TRACKING CONSUMER PURCHASING DATA

(75) Inventor: Roland Vincent St. John Killick, N. Ryde (AU)

(73) Assignee: The Coca-Cola Company, Atlanta, GA (US)

( * ) Notice: Subject to any disclaimer, the term of this patent is extended or adjusted under 35 U.S.C. 154(b) by 574 days.

(21) Appl. No.: 09/520,576

(22) Filed: Mar. 8, 2000

(51) Int. Cl.
*G06Q 30/00* (2006.01)
*G07G 1/14* (2006.01)

(52) U.S. Cl. ........................................ 705/14
(58) Field of Classification Search .................. 705/14, 705/16, 7, 10
See application file for complete search history.

(56) References Cited

U.S. PATENT DOCUMENTS

| | | | |
|---|---|---|---|
| 5,727,196 A * | 3/1998 | Strauss, Jr. et al. | |
| 5,832,457 A | 11/1998 | O'Brien et al. | 705/14 |
| 6,024,288 A * | 2/2000 | Gottlich et al. | 235/493 |
| 6,129,274 A * | 10/2000 | Suzuki | 705/16 X |
| 6,321,208 B1* | 11/2001 | Barnett et al. | 705/14 |
| 6,327,570 B1* | 12/2001 | Stevens | 705/7 |

FOREIGN PATENT DOCUMENTS

JP   10269461 A  * 10/1998

OTHER PUBLICATIONS

No Author listed, "What Grocers Want in Electronic Marketing Programs" POS News, v. 7, n. 13, p. N/A, May 1991.*

* cited by examiner

*Primary Examiner*—Arthur Duran
(74) *Attorney, Agent, or Firm*—Sutherland Asbill & Brennan LLP

(57) ABSTRACT

There is disclosed a method and system for tracking purchasing data for an individual consumer of a product or service. The method includes assembling a database of purchasing data and preferences for an individual consumer, extracting the purchasing data and preferences from the individual database by a terminal device, analyzing the extracted purchasing data and preferences at a collection center, and communicating customized information to the individual consumer based on the analysis of the extracted purchasing data and preferences.

22 Claims, 4 Drawing Sheets

DISAGGREGATED DATABASES FOR TRACKING CONSUMER PURCHASING DATA

TECHNICAL FIELD

The present invention relates to tracking consumer purchasing data and preferences in a retail environment by a provider of products or services. More particularly, the present invention relates to the assembly of individual databases of consumer purchasing data and preferences for individual consumers, the extraction of the consumer purchasing data and preferences from the individual databases by a terminal device, analysis of the extracted purchasing data and preferences at a collection center controlled by the provider, and communication of customized information to one or more of the individual consumers based on the analysis of the extracted purchasing data and preferences.

BACKGROUND OF THE INVENTION

Conventional market tracking involves the collection of consumer data for the purpose of determining what product attributes and advertising message will appeal to the greatest cross-section of the intended consumers. The promotion of the product is based on acquiring as much data as possible about the consumers so that the product and promotion can be tailored to attract the greatest number of consumers for the product. Such a method of marketing a product is by it very nature impersonal. Promotions are therefore not necessarily tailored to the individual consumer. For example, offering a purchasing incentive to an entire population of consumers may provide great incentive to some consumers but very little incentive others.

Accordingly, there exists a need for a system and method for tracking individual consumer's purchasing habits so that promotions and incentives can be tailored on an individual basis.

SUMMARY OF THE INVENTION

The present invention meets the above described needs by providing a method and system for tracking consumer purchasing data by assembling individual or disaggregated databases of consumer purchasing data and preferences for individual consumers relating to a product or service offered for sale by a provider, extracting the consumer purchasing data and preferences from the individual databases of the consumers by a terminal device, analyzing the extracted purchasing data and preferences at a collection center controlled by the provider of the products or services, and communicating customized information to one or more of the individual consumers based on the analysis of the extracted purchasing data and preferences. In connection with the present invention, the term "disaggregated databases" means individual databases that are completely separate physically and logically. Moreover, access is controlled completely by the individual consumer who remains the owner of the his or her data and is responsible for its accuracy.

The communication of customized information from the provider back to the consumer in accordance with the method and system of the present invention forges a direct connection between the consumer and the provider of the goods or services. The method and system creates that direct connection by coordinating four devices or subsystems connected by three communication channels. The four devices are: (1) a product or service identifier device; (2) a personal data acquistion device; (3) a terminal device; and (4) a collection center controlled by the provider of the products or services. Intelligent point of sale equipment may also be utilized in conjunction with the product identifier device and provide sales transaction data to the personal data acquisition device.

The product or service identifier device has the ability to communicate with the personal data acquisition device and identify the product or service and the attributes of the product or service to the personal data acquisition device. For example, each product or service is assigned a unique serial number. The identifier device communicates the serial number to the personal data acquistion device. The identifier device, for example, could be a computer readable medium, an RFI tag, a bar code label, or alpha numeric characters on a printed label attached to a product or associated with a service such as on an invoice. In addition, the identifier device communicates attributes about the product or sevice to the personal data acquistion device. Such attributes might include the size or price of the product. The identifier device in conjunction with point of sale equipment can also communicate details of the sales transaction for the product or service to the personal data acquistion device at the point of sale. Such data might include the time, date, location, selling price, etc.

The personal data acquisition device is any device that can acquire and store the identity and attributes of the product or service from the identifier device. The personal data acquistion device also can acquire and store details of the sales transaction involving the product or service from the point of sale equipment. In addition, the consumer may also manually input purchase data and preferences into the personal data acquisition device. Such personal data acquistion devices might include, without limit, an RFI (radio frequency information) tag reader with memory, a bar code scanner with memory, a personal digital assistant, a personal computer, a pager, or a cellular telephone with a data acquisition and storage capabilities. The ideal personal data acquistion device is portable, is always with the consumer, and has built in communications capabilities.

The terminal device is the device where the personal data acquisition device is accessed by the product or service provider to extract the purchasing data and preferences from the personal data acquistion device and to communicate customized information back to the personal data acquistion device. The terminal device can occupy a variety of locations including ATM machines, vending machines, point of sale equipment, or a network terminal such as a telephone or a computer modem. Whatever the location of the terminal device, the terminal device communicates with the personal acquisition device, extracts the purchasing data and preferences, downloads the purchasing data and preferences from the individual database of the personal acquistion device to the collection center, and communicates customized information back to the consumer's personal data acquisition device.

The collection center is typically a centrally located general purpose digital computer which is capable of receiving purchasing data and preferences from the personal acquisition devices via the terminal device and processing the received purchasing data and preferences. The computer handles various management tasks in connection with the operation of the method and system for tracking individual purchasing data and preferences, such as, assigning serial numbers to products or services, fraud detection, security, etc. In connection with processing the received purchasing data and preferences, the computer at the collection center has software which allows it to build an inferred marketing database from the actual purchasing data and preferences received. The inferred marketing database is not the sum of all of the individual databases. Instead the inferred marketing database represents a section across or through the individual consumer databases. By taking samples or slices of the individual consumer databases over short periods of time, the inferred marketing database resembles the sum of all of the individual consumer databases. Over time, this estimate will grow more accurate until the differences would be negligible, but the marketing database would still be inferred.

The provider can then instruct the collection center computer to use the inferred database in connection with ordinary marketing analysis and projections. In addition, the collection center computer can generate customized messages and information directed to one or more individual consumers based on the purchasing data and preferences received from the personal data acqustion devices via the terminal devices. The consumer's preferences will be used to modify the format and language used in communicating with the individual consumer. Depending on the sophistication of the personal data acquisition devices and the terminal devices, the customized information may be used for a number of purposes including offering additional purchasing opportunities, discounts on future purchase, access to events, or other marketing offers and incentives that are customized to the individual consumer based on the individual consumer's purchasing data and preferences.

The method and system of the present invention provide a direct connection to the consumer which gives the provider of the products or services the ability to focus its promotions and incentives on an individual level instead on a mass marketing level. The direct connection produces a more efficient and focused marketing of products and services.

DETAILED DESCRIPTION OF EXEMPLARY EMBODIMENTS

Exemplary embodiments of the present invention will hereinafter be described with reference to the drawings, in which like numerals indicate like elements throughout the several figures. The present invention is a method and system for tracking consumer purchasing data using distributed databases. The invention operates within the environment where the provider of a product or a service offers that product or service to individual consumers. For the purposes of the following description and the appended claims the term "products" shall mean both products and services of all kinds offered by the provider of products or services to consumers.

The Distributed Database Tracking System

Figure 1:
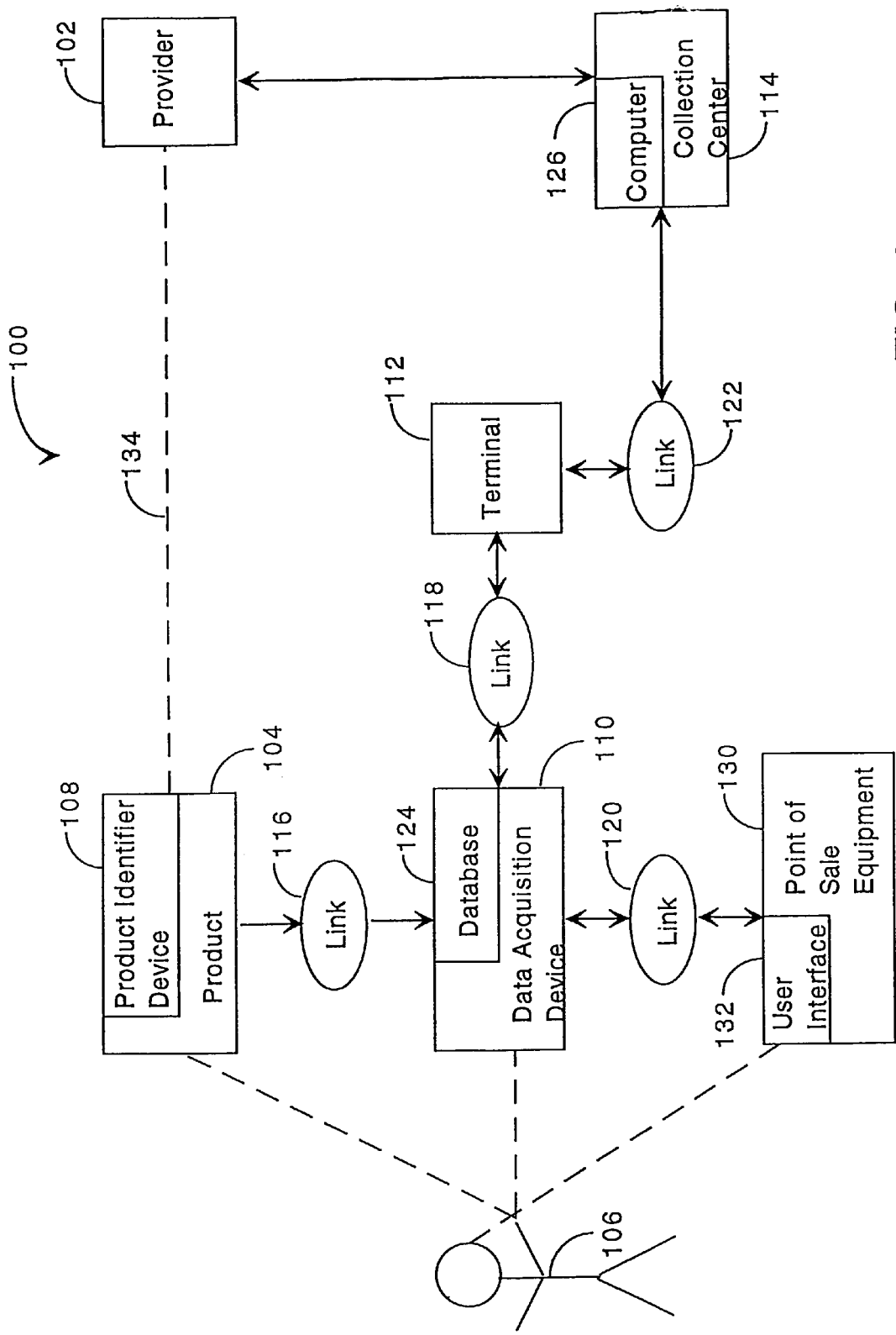
FIG. 1 is a pictorial diagram illustrating a system for tracking consumer purchasing data for a consumer product or service using a distributed database.

Turning to FIG. 1, a distributed database tracking system 100 of the present invention for tracking purchasing data is shown with its component parts. The tracking system 100 is configured to enable a provider 102 of a product 104 to track the purchasing data and preferences for a consumer 106 of the product 104. The tracking system 100 comprises a product identifier device 108, a personal data acquisition device 110 for assembling a personal, individual disaggregated database 124, a terminal device 112, a collection center 114, point of sale equipment 130, and communication links 116, 118, 120, and 122.

The tracking system 100 begins tracking the individual consumer's purchasing data when the consumer 106 purchases the product 104 from provider 102 through provider's normal retail distribution 134. The consumer has in his or her possession the personal data acquisition device 110. When the product 104 is purchased or consumed, the product identifier device 108 transmits the identity of the product 104 to the data acquisition device 110 via communication link 116. In addition, the point of sale equipment 130 may also transmit sales transaction data to the data acquisition device 110. The data acquisition device 110 acquires and stores the product identity and the sales transaction data from which the data acquisition device 110 can build a personal disaggregated database 124 for the consumer 106. The disaggregated database 124 also includes personal or preference data entered into the personal data acquisition device 110 by the consumer 106.

As the consumer 106 moves about, he or she will eventually encounter a terminal device 112, and the communication link 118 will be established. The terminal device 112 is programmed from the collection center 114 via communication link 122 to poll the personal data acquisition device 110 and extract part or all of the purchasing data and preferences from the disaggregated database 124 stored in the personal data acquisition device 110. The polling process may also clear extracted purchasing data from the consumer's personal database 124 in the personal data acquisition device 110. Once the requested purchasing data and preferences have been extracted by the terminal device 112 from the database 124, the purchasing data and preferences are transmitted via communication link 122 to the collection center 114 which is controlled by the provider 102 of the consumer product 104.

The collection center 114 includes a general purpose digital computer 126 that has been programmed to analyze the purchasing data and preferences received from the consumer 106 as well as other consumers of the product 104. In connection with that analysis, the collection center builds an inferred marketing database. The inferred marketing database is not the sum of all the individual disaggregated databases 124. Instead the inferred marketing database is a section across or through the disaggregated databases 124. Thus over a short period of time the inferred marketing database will resemble the entirety of the disaggregated data bases 124. Over a longer period of time the inferred marketing database will more closely resemble the entirety of the disaggregated databases 124.

The inferred marketing database is produced by using conventional filters and inference engines. In general, a filter is a software program that contains a set of conditions. If the conditions of the filter are met, a dependent change or changes occur in another software program. In the present invention, the collection center computer may collect only data from the disaggregated databases 124 of the consumers that matches the filter conditions. For example, the filter might allow collection of only the data for one product or only the data for a particular time range. In general, an inference engine is a software program that, through artificial intelligence, can deduce a likely outcome from a set of data. For example, the collection center computer using a filter might collect consumption data from the disaggregated databases 124 of the consumers, including age, brand, and frequency of consumption. From that data, the inference engine may deduce that the entire population engages in the same frequency of consumption for the brand. As the inference engine gathers more and more data, it can revise its deduction to match the more recently acquired data.

Further analysis of the inferred marketing database may include standard marketing analysis of purchasing data and consumer preferences. In addition, and in accordance with the present invention, the disaggregated database 124 and the purchasing data and preferences extracted therefrom allows the computer 126 to generate customized information that will be of particular interest to the individual consumer 106. The customized information may take the form of a personal message that communicates purchasing opportunities or promotions for the consumer 106. The customized information is then sent to the consumer 106 via communications links 122 and 118. The tracking system 100 may have one or more collection centers 114.

Data Acquisition Device

The data acquisition device 110 can take on a number of embodiments within the tracking system 100. The data acquisition device 110 has three primary attributes. First, the data acquisition device 110 should be portable and easily carried by the consumer 106 at all times. Second, the data acquisition device 110 must be able to acquire purchasing data and consumer preferences including product identification data and sales transaction data for the consumer 106 and store that purchasing data in the individual database 124. Third, the data acquisition device must be able to respond to queries from the terminal device 112 and download all or part of the database 124 to the terminal device 112. The data acquisition device 110 can be, for example, an RFI tag, a magnetic medium, an RFI tag reader with memory, a magnetic medium reader with memory, a bar code reader with memory, a digital computer, such as a personal digital assistant (PDA), a pager, or a cellular telephone that is capable of acquiring and storing purchasing data and preferences for consumer 106. The tracking system 100, in some cases, may incorporate the terminal device 112 into the data acquisition device 110. For example, a cellular telephone could receive product identification data from the product identifier 108 and sales transaction data from the point of sale equipment 130 via radio frequency (RF) communication links 116 and 120. Periodically or on demand from the collection center 114, the cellular telephone, serving as a terminal device, could transmit all or part of the database 124 directly to the collection center 114.

The Product Identifier Device

The product identifier device 108 identifies the product purchased or consumed by the consumer 106. The product identifier device 108 identifies the product to the data acquisition device 110. The product identifier device 108 can be, for example, a magnetic medium, a magnetic medium write device, an RFI tag, an RFI tag transmitter device, a bar code label, a compact disk, a DVD disk, a hologram, or an alpha numeric serial number label. The product identifier device 108 is attached to the product by the provider 102 of the product 104. The product identifier 108 is activated either at the time of purchase or when the product is consumed by the consumer 106. Alternatively the product identifier device 108 is merely scanned by the data acquisition device 110 at the time of purchase or consumption.

The Point of Sale Equipment

The point of sale equipment 130 processes the sale transaction when the consumer 106 buys the product 104. At the time of the sale, the point of sale equipment 130 transmits sales transaction data to the data acquisition device 110 via communication link 120. The point of sale equipment 130 can be, for example, a magnetic medium write device or an RFI tag transmitter device. The sales transaction data transmitted by the point of sale equipment 130 to the data acquisition device 110 supplements the database 124 with additional information about the sale of the product 104 to the consumer 106 such as time and date of sale, selling price, sales location, etc. Such sales transaction data may be useful to the collection center 114 in producing the customized information for the consumer 106.

The point of sale equipment 130 may also have a user interface 132, such as a display screen, printer, and/or speakers to communicate with the consumer 106 directly. In that regard, the point of sale equipment may include a magnetic medium reader, an RFI tag reader or RF receiver. When a consumer is in the vicinity of the point of sale equipment, the point of sale equipment receives information from the consumer's data acquisition device 110, which allows the point of sale equipment 130 to generate a greeting to the consumer 106 via the user interface 132.

The Terminal Device

The terminal device 112 polls the data acquisition device 110 and downloads part or all of the purchasing data and preferences from the database 124. The polling is undertaken by the terminal device 112 in response to the data acquisition device 110 coming into the vicinity of the terminal device 112. The terminal device 112 downloads the purchasing data and preferences for the database 124 in accordance with instructions from the collection center 114.

The terminal device 112 can be, for example, a magnetic media write device or an RFI tag transmitter device. The terminal device 112 can be located at the point of sale or at other locations. If the data acquisition device 110 is an RFI tag, for example, the terminal device 112 will contain an RFI tag reader which will read the database 124 stored by the RFI tag via communications link 118. Alternatively, the terminal device 112 may be a magnetic medium reader which reads the magnetic medium on a card or the like which serves as the data acquisition device 110.

Once the purchasing data and preferences are downloaded from the data acquisition device 110 by the terminal device 112, the terminal device 112 transmits the purchasing data and preferences to the collection center 114 via communication link 122. As previously, stated, the terminal device 112 can be incorporated physically into the data acquisition device 110.

Data Collection Center

The data collection center 114 is associated with the product provider 102 and is generally under the control of the provider 102. One or more data collection centers may be utilized in connection with the present invention. The data collection center 114 uses the general purpose digital computer 126 to receive purchasing data and preferences, build an inferred marketing database from the purchasing data and preferences, analyze the inferred marketing database, create customized information for individual consumers, and send such customized information to the individual consumers.

In connection with building the inferred marketing database, the computer 126 can combine purchasing data and preferences from a number of consumers. From the inferred marketing database, the computer 126 can determine market trends in conventional fashion. In addition, the computer can analyze the purchasing data and preferences from an individual consumer, such as consumer 106, and generate custom messages for such individual consumer. For example, the computer 126 could determine that the consumer 106 purchases a certain soft drink sold by the provider 102 more frequently that other brands. As a consequence, the provider could instruct the computer 106 to offer the consumer 106 a discount on purchases of that soft drink. Alternatively, the provider 102 could offer other incentives to induce the consumer 106 to purchase other products or services that are related to the consumer's purchasing patterns and preferences.

Once an incentive or other information relevant to the consumer has been generated from analyzing the consumer's purchasing data and preferences, the computer 126 sends that customized information to the consumer 106 via communications link 122, terminal device 112, communications link 118, and data acquisition device 110.

The Communication Links

The communications links 116, 118, 120, and 122 connect the various elements of the purchasing data tracking system 100 together. The communication links can take a number of forms. The communications link 116 between the product identifier 108 and the data acquisition device 110 is preferably a wireless communications link and may be an RF, infrared, or magnetic link. Similarly, the communication link 120 from the data acquisition device 110 to the point of sale equipment 130 is preferably a wireless link and may be RF, infrared, or magnetic links. The communication link 118 from the data acquisition device 110 to the terminal device 112 may be a wired link when the terminal device is physically incorporated in to the data acquisition device 110, or the communication link 118 may be a wireless link such as RF, infrared, or magnetic links. The communication link 122 from the computer 126 of the collection center 114 to the terminal device 112 may be either a wireless or a wired link. A local area or wide area wired network may be used.

The Disaggregated Database Tracking Method

Figure 2:
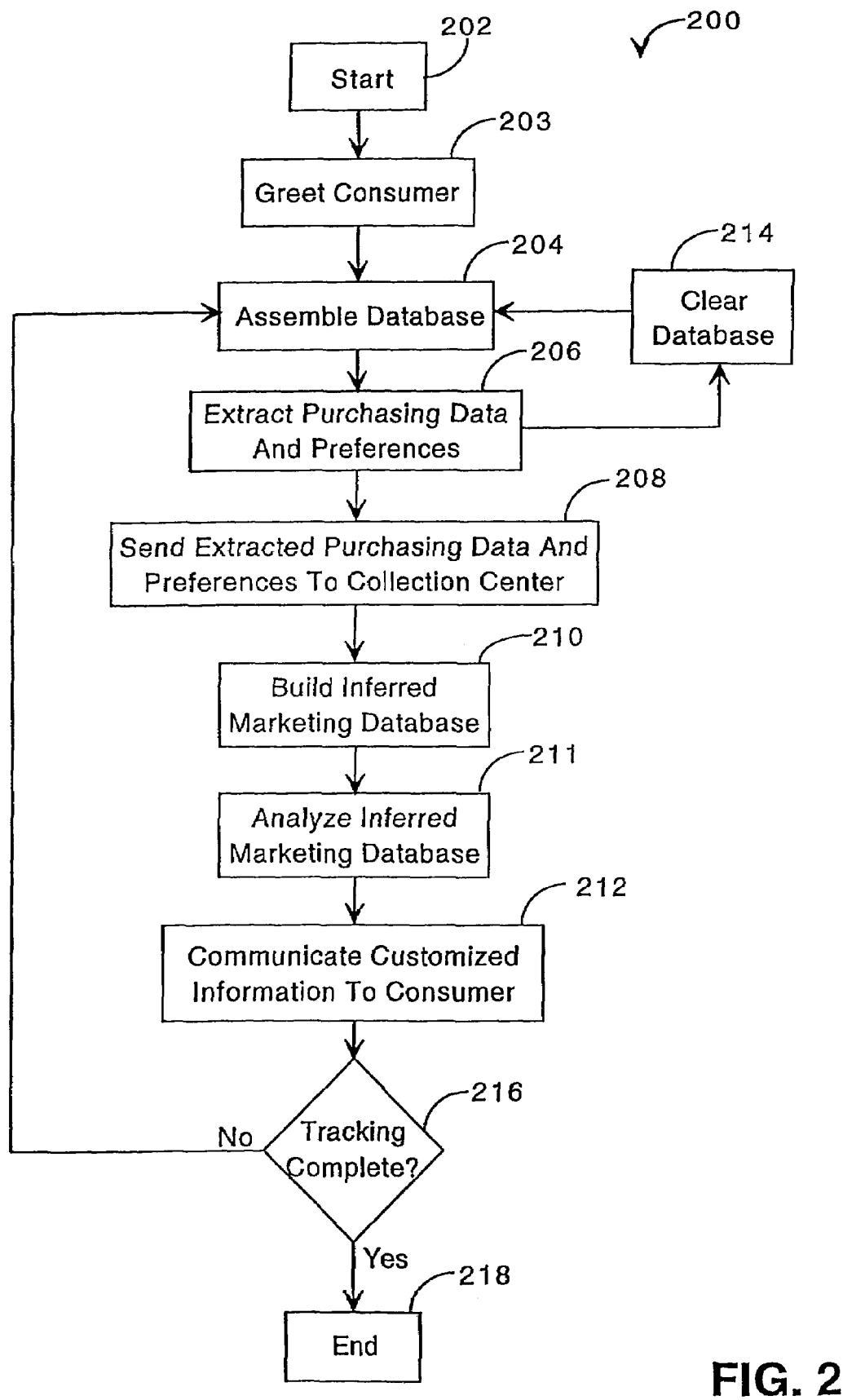
FIG. 2 is a flow chart illustrating a method of for tracking consumer purchasing data for a consumer product or service using a distributed database.

Turning to FIG. 2, the distributed database tracking method of the present invention is illustrated. The tracking method 200 begins at step 202 and proceeds to step 203. At step 203, the point of sale equipment recognizes that the consumer 106 is in the vicinity, acquires data from the consumer's data acquisition device 110 via communication link 120, and presents a greeting via its interface 132. The greeting may be graphic or verbal, or the greeting may merely be a change in the display presented by the point of sale equipment.

Once the greeting is presented, the tracking method 200 proceeds to step 204. At step 204, the tracking method 200 assembles individual database 124 by means of the data acquisition device 110. Product identification data and possibly sales transaction data are received by the data acquisition device 110 from the product identifier device 108 and the point of sale equipment 130, respectively. The consumer preferences can also be input directly into the data acquisition device 110. The database 124 assembled at step 204 is a database that is specific to the consumer 106 and is a record of the purchasing data and preferences of the consumer 106.

Once the database 124 has been assembled at step 204, the tracking method 200 proceeds to step 206. At step 206, all or part of the purchasing data and preferences for the consumer 106 are extracted from the database 124 by means of the terminal device 112 via communication link 118. After the terminal device 112 has extracted the purchasing data and preferences from the disaggregated database 124 for the consumer 106, the method proceeds to step 214 where the method may clear the extracted purchasing data from the database 124.

Once the purchasing data and preferences have been extracted at step 206 and the database 124 cleared, the tracking method 200 proceeds to step 208 where the extracted purchasing data and preferences are sent to the collection center 114 by the terminal device 112 via communication link 122. From step 208, the method proceeds to step 210.

At step 210, the tracking method 200 analyzes the extracted purchasing data and preferences to build the inferred marketing database by means of the computer 126 at the data collection center 114. From step 210 the method 100 moves to step 211.

At step 211, the method analyzes the inferred marketing database. The analysis can be of two general types. First, the computer 126 can combine purchasing data from a number of consumers and use the combined purchasing data to analyze the market for various products and generated marketing forecast as is conventional done with purchasing data collected from a variety of sources including consumer surveys.

Second, and in accordance with the present invention, the computer 126 can analyze the individual purchasing data and preferences from the individual consumer and create personal responses to the consumer based on the consumer's individual purchasing habits and proclivities. Such a response may be in the form of customized information for the particular individual consumer. For example, the customized information may take the form of an incentive offer to purchase additional products of the kind already purchased by the consumer at a discount. Alternatively, the consumer may be offered products related to those already purchased. The purchaser of golf clubs, for example, might be offered golf balls or a membership at a golf course, perhaps at a discount. In addition, the customized information might be an offer for unrelated goods or services, again perhaps at a discount. Subsequent extraction and analysis of purchasing data from the consumer can be used to further tailor future offers or other customized information to the consumer.

Once the analysis of the inferred marketing database has been completed by the computer 126 and customized information for the particular consumer has been generated by the computer 126, the tracking method 200 proceeds to step 212. At step 212, the customized information is sent to the consumer 106 via communication link 122, terminal device 112, communication link 118, and data acquisition device 110.

Once the customized information is sent to the consumer, the tracking method proceeds to step 216 where the method determines whether the purchasing data tracking for the consumer 106 is complete. If no further tracking is required, the method 200 follows the "yes" branch, and the tracking method 200 ends at step 218. Alternatively, if the tracking is to continue, the tracking method 200 follows the "no" branch, and the method returns to step 204 and continues.

Figure 3:
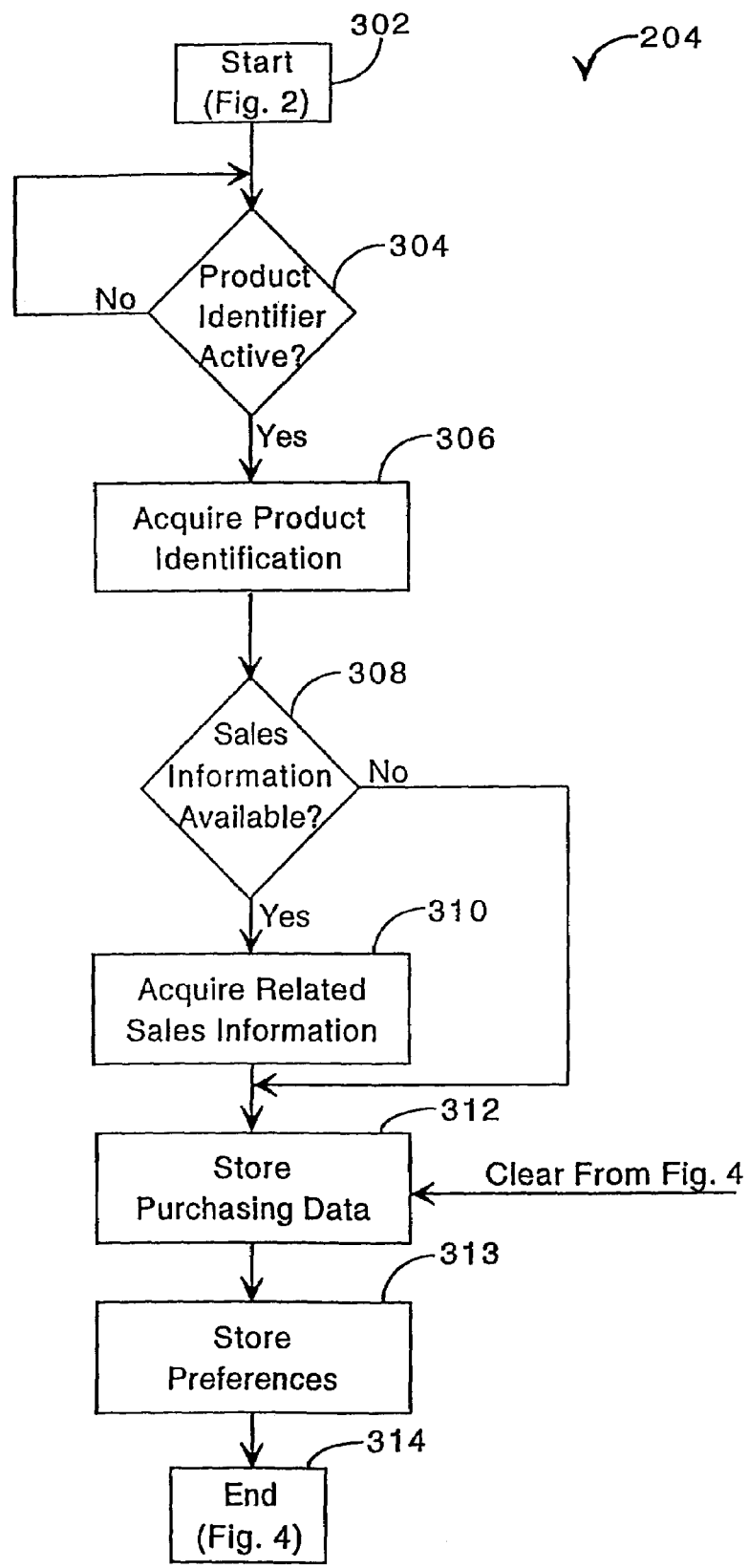
FIG. 3 is a flow chart illustrating the assembly step of FIG. 2.

Turning to FIG. 3, the purchase data assembly step 204 of the tracking method 200 is illustrated in greater detail. The data assembly step 204 (from FIG. 2) begins at step 302 and proceeds to step 304. At step 304, the method of the assembly step 204 determines whether the product identifier device 108 is activated. If the product identifier device is not activated, the method follows the "no" branch and continues searching for an activated product identifier device 108. If the product identifier 108 is activated, the method follows the "yes" branch, and the method acquires the product's identification at step 306 for the database 124 in the data acquisition device 110.

Once the product identification has been acquired by the data acquisition device 110 at step 306, the method of the assembly step 204 proceeds to step 308. At step 308, the method determines whether sales transaction data is available from the point of sale equipment 130. If sales transaction data is available, the method follows the "yes" branch to step 310. If sales transaction data is not available, the method follows the "no" branch to step 312.

At step 310, the method acquires the sales transaction data from the point of sale equipment 130, and the sales transaction data is entered into the database 124 of data acquisition device 110. Such sales transaction data may include, for example, selling price, location, time, etc. Once the sales transaction data has been added to the database 124 in the data acquisition device 110, the method proceeds to step 312.

Figure 4:
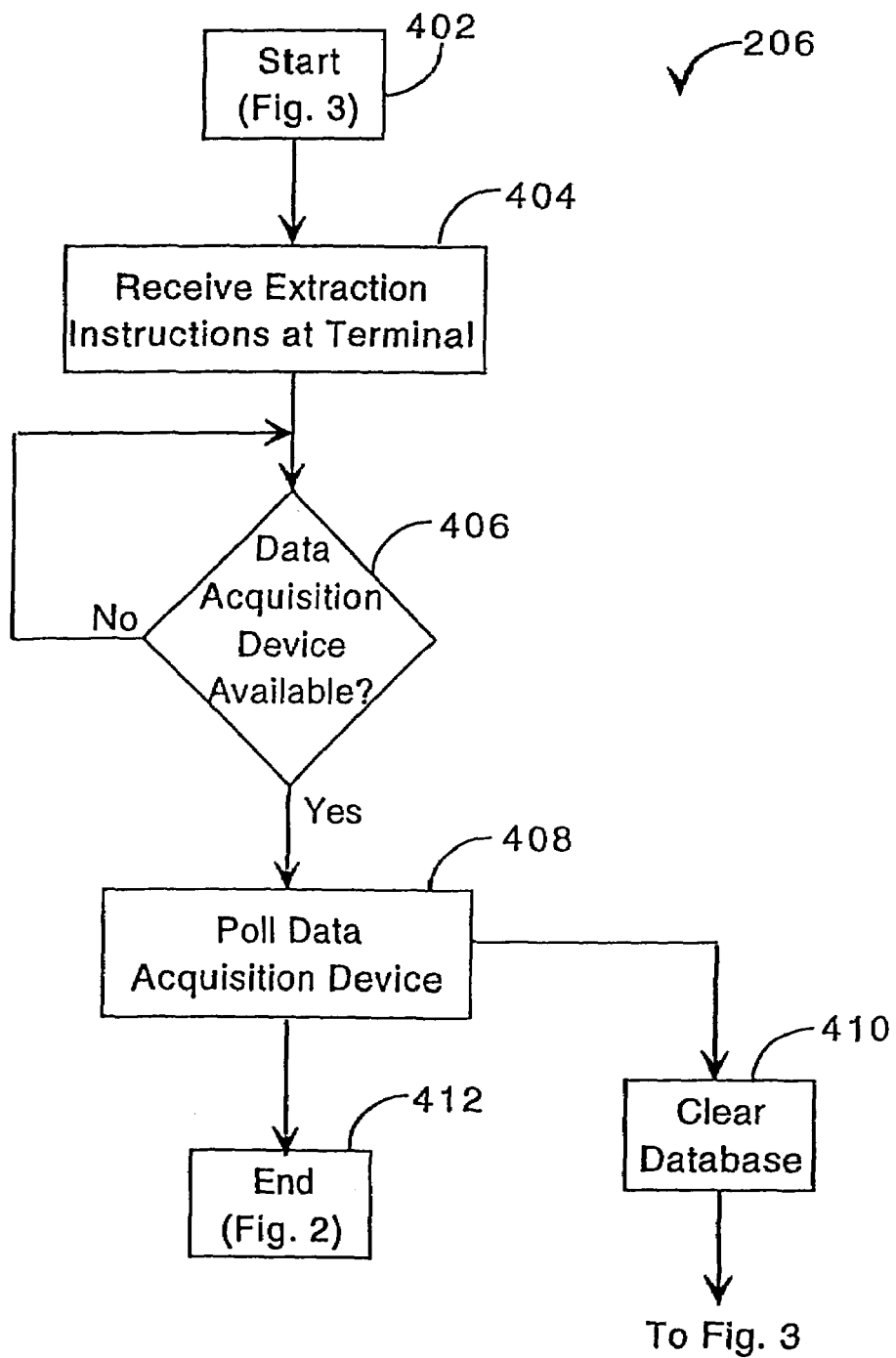
FIG. 4 is a flow chart illustrating the extraction step of FIG. 2.

At step 312, the method of assembly step 204 stores the purchasing data (product identification data and/or sales transaction data) in the database 124. A clear instruction from step 410 of FIG. 4 clears the stored database once the purchasing data has been extracted as more fully explained in connection with the method of step 206 (FIGS. 2 and 4). Once the purchasing data has been stored at step 312 in database 124, the method of assembly step 204 proceeds to step 313.

At step 313, the method 204 stores the consumers personal data and/or preferences in the database 124. Once the preferences have been stored at step 313, the method 204 ends at step 314 proceeds to the extraction step 206 illustrated in FIG. 4.

Once the assembly step 204 of tracking method 200 is completed at step 314 (FIG. 3) the tracking method 200 proceeds to the extraction step 206 which is illustrated in greater detail in FIG. 4. The extraction step 206 continues at step 402 and proceeds to step 404. At step 404, the terminal 112 receives instructions from collection center 114 for extracting part or all of the purchasing data and preferences in database 124. The extraction instructions may either be specific for the particular consumer or the particular circumstance then existing at the collection center 114 at the time the database extraction occurs. Alternatively, the terminal device 112 may have received standing instructions for the extraction of purchasing data and preferences from the database 124 which remain in effect until superceding instructions are received.

From step 404 the method of extraction step 206 proceeds to step 406 where the method determines if a data acquisition device 110 with its database 124 is available (within range and connected to the communications link 118). If the data acquisition device 110 is not available, the method follows the "no" branch and continues looping until the data acquisition device 110 is found on the communication link 118. Once the data acquisition device 110 is available on communication link 118, the method follows the "yes" branch to step 408.

At step 408, the method of extraction step 206 polls the data acquisition device 110 and extracts all or part of the purchasing data and preferences from the database 124 via communication link 118 based on the extraction instructions from the collection center 114. Once the purchasing data has been extracted, the method proceeds to steps 410 and 412.

At step 410, the method sends a clear instruction to the data acquisition device 110 and clears the extracted purchasing data from the database 124 (step 312, FIG. 3). At step 412, the method of extraction step 206 ends, and the method 200 proceeds at step 208 (FIG. 2).

The tracking system 100 and tracking method 200 are illustrated by the following examples.

EXAMPLE 1

RFI Tag

For Example 1, the data acquisition device 110 is an RFI tag carried by the consumer 106. No product identifier device on the product 104 is used. The product identification data and sales transaction data is provided by the point of sale equipment 130 which is an automatic vending machine, such as a soft drink vending machine. The vending machine also serves as the terminal device 112 and has the user interface 132, which may be a display screen, printer, and/or speakers.

When the consumer with his or her RFI tag (the data acquisition device 110) approaches the vending machine to buy a soft drink, the vending machine (operating as the point of sale equipment 130) recognizes that the data acquisition device, the consumer's RFI tag is in range. The vending machine can then offer a greeting to the consumer. When the consumer completes his or her purchase of the soft drink at the vending machine, the vending machine transfers the product identification data and sales transaction data to the consumer's RFI tag, and that information is assembled into the database 124 in the RFI tag along with the preferences of the consumer.

When the consumer next approaches a vending machine either to buy another soft drink or is merely in the vicinity of the vending machine, the vending machine, operating as the terminal device 112 can poll the RFI tag, extract the all or part of the purchasing data and preferences from the RFI tag, clear the database on the RFI tag, and transmit the extracted purchasing data and preferences to the collection center 114 where it is analyzed and customized information for the consumer is generated.

The next time the consumer is in the vicinity of a vending machine, the vending machine, operating as the terminal device 112, can communicate the customized information to the consumer via the display screen, printer, and/or speakers. Alternatively, the customized information could simply be communicated in the form of offering the consumer a reduced price for the next purchase of the soft drink as a reward for the prior purchase of a certain number of soft drinks from the provider.

EXAMPLE 2

Cellular Telephone with RFI Tag Reader

For Example 2, the data acquisition device 110 is a cellular telephone with RFI tag reader carried by the consumer 106. The cellular telephone also serves as the terminal device 112. The product identifier device 108 on the product 104 is an RFI tag that is activated when the product 104 is opened or consumed. The point of sales equipment 130 is an automatic vending machine, such as a soft drink vending machine. The vending machine has the user interface 132.

The consumer 106 with his or her cellular telephone enters the vicinity of the vending machine. The vending machine recognizes the presence of the consumer from the database 124 carried by the cellular telephone, and the vending machine modifies its interface 132 to present the appropriate greeting to the consumer 106, perhaps inviting the consumer 106 to buy a soft drink. The consumer 106 purchases a soft drink in the usual fashion.

Later when the consumer stops to open the soft drink and consume it, an RFI tag on the bottle is activated. The RFI tag communicates with the cellular telephone and thereby confirms that the soft drink was consumed by the consumer. That information is entered into the personal database 124 of the consumer 106. Alternatively, at the time of purchase, the vending machine could transmit the details of the transaction to the database 124 of the consumer's data acquisition device, the cellular telephone. Such details might include the identity of the product, the price, the date and time, the location, etc.

Later the purchasing data and preferences are extracted from the database 124 on the cellular telephone. The extraction may be done automatically by the cellular telephone periodically dialing the computer 126 via the communication link 122. Alternatively, the extraction may be in response to a polling request from the computer 126 at the collection center 114. After the extraction of the purchasing data, the cellular telephone clears its database of extracted purchasing data.

Later, after the consumer's purchasing data and preferences have been extracted and the collection center has analyzed the purchasing data and preferences, the consumer receives a message on the cellular phone, preferably a text message, advising the consumer of a concert and that entry to the consumer is free as a bonus because of the consumer's past purchases of the soft drink product 104.

When the consumer reaches the concert venue, the cellular telephone's database is read at the turnstile (a terminal device), and the consumer is admitted without charge (the equivalent of a personal greeting of step 203, FIG. 2). At the concert, vendors that have prior arrangements with the provider 102 offer promotional merchandise based on the analysis of the consumer's past purchasing habits and preferences.

After the concert, the consumer can record his or her evaluation of the concert in the database 124, thereby assuring that the collection center and the provider will know the consumer's preference for additional performances as an incentive.

The system and method of the present invention allow the provider of products or services to track individual consumer's consumption habits by means of individual disaggregated databases assembled for each consumer. From the purchasing data in the individual database, the provider is able to provide direct communication of personal and customized information to that consumer.

What is claimed is:

1. A system for analyzing consumer data, comprising:
   a terminal device;
   a consumer data acquisition device that stores consumer data; and
   a computer program for analyzing consumer data wherein said computer program is at least in part remote from said terminal device, and
   a collection center, in communication with the terminal device, where the collection center instructs the terminal device to extract all or part of the consumer data from the consumer data acquisition device,
   wherein the terminal device is operable to extract at least a portion of the consumer data stored on the consumer data acquisition device for analysis by the computer program.

2. The system of claim 1, wherein the terminal device is further operable to transmit consumer data to said consumer data acquisition device.

3. The system of claim 1, wherein said consumer data acquisition device is selected from the group of devices consisting of a Radio Frequency Identification (RFID) tag, a magnetic medium, an RFID tag having memory, a magnetic medium having memory, a bar code reader having memory, a digital computer, a personal digital assistant, a pager, and a cellular telephone.

4. The system of claim 1, wherein said terminal device is positioned local to at least one device selected from the group of devices consisting of an ATM machine, a vending machine, a point-of-sale terminal, and a network terminal.

5. The system of claim 2, wherein said terminal device is operable to clear at least a portion of said consumer data from a memory of said consumer data acquisition device in which the consumer data is stored.

6. The system of claim 2, wherein said terminal device is operable to modify at least a portion of said consumer data from a memory of said consumer data acquisition device in which the consumer data is stored.

7. The system of claim 1, wherein said computer program is operable to analyze consumer data, said analysis further comprising filtering said consumer data.

8. The system of claim 1, wherein the terminal device is operable to extract at least a portion of unfiltered consumer data stored on the consumer data acquisition device for analysis by the computer program.

9. The system of claim 1, wherein the terminal device is operable to extract only a portion of the consumer data stored on the consumer data acquisition device for analysis by the computer program.

10. The system of claim 1, further comprising a data collection center in communication with said terminal device, and wherein said computer program resides, at least in part, at said data collection center.

11. The system of claim 1, wherein the output of said analysis is an inferred marketing database.

12. The system of claim 1, wherein said at least a portion of the consumer data is extracted from the consumer data acquisition device based at least in part on instructions from the computer program.

13. A system for analyzing consumer data, comprising:
    a terminal device;
    a consumer data acquisition device that stores consumer data; and
    a computer program for analyzing consumer data wherein said computer program is executed at least in part at said consumer data acquisition device and at least in part at another location; and
    a collection center, in communication with the terminal device, where the collection center instructs the terminal device to extract all or part of the consumer data from the consumer data acquisition device,
    wherein the terminal device is operable to extract at least a portion of the consumer data stored on the consumer data acquisition device for further analysis by the computer program.

14. The system of claim 13, wherein the terminal device is further operable to transmit consumer data to said consumer data acquisition device.

15. The system of claim 13, wherein said at least a portion of the consumer data is extracted from the consumer data acquisition device based at least in part on instructions from the computer program.

16. The system of claim 13, wherein said consumer data acquisition device is selected from the group of devices consisting of a Radio Frequency Identification (RFID) tag, a magnetic medium, an RFID tag having memory, a magnetic medium having memory, a bar code reader having memory, a digital computer, a personal digital assistant, a pager, and a cellular telephone.

17. The system of claim 15, wherein said terminal device is operable to modify at least a portion of said consumer data from a memory of said consumer data acquisition device in which the consumer data is stored.

18. The system of claim 13, wherein said computer program is operable to analyze consumer data, said analysis further comprising filtering said consumer data.

19. The system of claim 13, wherein the terminal device is operable to extract at least a portion of unfiltered consumer data stored on the consumer data acquisition device for analysis by the computer program.

20. The system of claim 13, wherein the terminal device is operable to extract only a portion of the consumer data stored on the consumer data acquisition device for analysis by the computer program.

21. The system of claim 13, further comprising a data collection center in communication with said terminal device, and wherein said computer program resides, at least in part, at said data collection center.

22. The system of claim 13, wherein the output of said analysis is an inferred marketing database.

* * * * *